United States Patent [19]

Takahashi et al.

[11] Patent Number: 5,691,261
[45] Date of Patent: Nov. 25, 1997

[54] SILICON NITRIDE CERAMIC

[75] Inventors: Akira Takahashi; Masaaki Masuda, both of Nagoya; Keiichiro Watanabe, Kasugai, all of Japan

[73] Assignee: NGK Insulators, Ltd., Nagoya, Japan

[21] Appl. No.: 589,171

[22] Filed: Jan. 22, 1996

Related U.S. Application Data

[63] Continuation of Ser. No. 437,216, May 8, 1995, abandoned, which is a continuation of Ser. No. 179,685, Jan. 11, 1994, abandoned.

[30] Foreign Application Priority Data

Jan. 22, 1993 [JP] Japan ................................ 5-009481

[51] Int. Cl.$^6$ .................................................. C04B 35/587
[52] U.S. Cl. .................................................. 501/97; 501/98
[58] Field of Search ........................................ 501/97, 98

[56] References Cited

U.S. PATENT DOCUMENTS

| | | | |
|---|---|---|---|
| 4,904,624 | 2/1990 | Yeckley | 501/97 |
| 5,017,531 | 5/1991 | Ukai et al. | 501/97 X |
| 5,118,644 | 6/1992 | Watanabe et al. | 501/85 |
| 5,171,723 | 12/1992 | Moriguchi et al. | 501/97 |
| 5,229,046 | 7/1993 | Watanabe et al. | 501/97 X |

FOREIGN PATENT DOCUMENTS

| | | |
|---|---|---|
| 62-297269 | 12/1987 | Japan . |
| 63-147867 A | 6/1988 | Japan . |
| 63-252967 A | 10/1988 | Japan . |
| 1-145380 A | 6/1989 | Japan . |
| 2-255573 | 10/1990 | Japan . |
| 2-50076 | 11/1990 | Japan . |
| 3-290370 A | 12/1991 | Japan . |

*Primary Examiner*—Karl Group
*Attorney, Agent, or Firm*—Kubovcik & Kubovcik

[57] ABSTRACT

A silicon nitride ceramic possessing excellent strength of the surface, including a silicon nitride and a rare earth oxide compound and being characterized in that the ratio of the transverse rupture strength, at room temperature, of the fired surface used as a tensile surface to the transverse rupture strength, at room temperature, of the worked surface used as a tensile surface subjected to working so as to have a surface roughness of $R_{max}$ 0.8 µm or less is 0.7 or more, and the strength ratio is satisfied even when any portion besides the fired surface is utilized as the tensile surface to be worked to have a surface roughness of $R_{max}$ 0.8 µm or less. The present invention also provides a process for producing a silicon nitride ceramic including the steps of: (1) mixing $\alpha$-$Si_3N_4$ powder and $\beta$-$Si_3N_4$ powder to obtain a raw material powder which satisfies the formula $0.05 \leq \beta/\alpha+\beta \leq 0.50$, in which $\alpha$ refers to the weight of $\alpha$-$Si_3N_4$ powder and $\beta$ refers to the weight of $\beta$-$Si_3N_4$ powder; (2) mixing at least one sintering aid with the raw material powder; (3) forming the powder mixture to give a compact; and (4) firing the compact at a temperature ranging from 1800° to 2000° C. under a nitrogen atmosphere having an atmospheric pressure of at least 1 atm.

7 Claims, No Drawings

SILICON NITRIDE CERAMIC

This application is a continuation of application Ser. No. 08/437,216 filed May 8, 1995, now abandoned, which is a continuation of application Ser. No. 08/179,685, filed Jan. 11, 1994, now abandoned.

BACKGROUND OF THE INVENTION AND RELATED ART STATEMENT

The present invention relates to a silicon nitride ceramic having high strength, and more particularly, to a silicon nitride ceramic having high strength on its surface without working after firing, and a process for production thereof.

A silicon nitride ceramic has conventionally been drawing attention because of its high strength at high temperatures, chemical stability, etc., and therefore, various researches have been made into the application of a silicon nitride ceramic to materials to be used for heat engines such as diesel engines and gas turbine engines.

Since silicon nitride generally has low sinterability, a rare earth oxide such as $Y_2O_3$ is first added as a sintering aid to silicon nitride powder. Then, the powder is formed to make a compact having a desired shape. Finally, the compact is subjected to firing under gas pressure to obtain a silicon nitride ceramic.

As a raw material powder of silicon nitride to produce such a ceramic, there has been used a raw material containing 90% or more of $\alpha$-$Si_3N_4$ in consideration of the sinterability, etc. It is known that firing causes phase transition from $\alpha$-$Si_3N_4$ to $\beta$-$Si_3N_4$ and forms columnar crystals.

However, firing the compact containing such a large amount of $\alpha$-$Si_3N_4$ brings about roughness of crystallization and the like upon phase transition and does not give a minutely sintered ceramic, resulting in the deterioration of the strength and the like. From such a view point, Japanese Patent Laid-Open 62-297269, Japanese Patent Publication 2-50076, and Japanese Patent Laid-Open 2-255573 each disclose a process for producing a silicon nitride ceramic, in which a large amount of $\beta$-$Si_3N_4$ is added to a raw material powder.

A silicon nitride ceramic obtained by any of these processes (i.e., a process in which a raw material contains mainly $\alpha$-$Si_3N_4$ and a process in which a large amount of $\beta$-$Si_3N_4$ is added to a raw material) possesses large pores on the surface of the ceramic just after firing (without working). (The surface without working after firing is hereinafter referred to as the "fired surface".) The problem is that such a ceramic does not possess sufficient strength on the fired surface because stress concentrates in the peripheral portions of large pores.

Therefore, any of silicon nitride ceramics obtained by either of these two kinds of processes needs to be subjected to working onto the fired surface so as to produce a final product having a surface with desired strength. The step of working is laborious, time-consuming, and increases costs.

Moreover, a ceramic obtained by any of the conventional processes does not possess satisfactory strength on the fired surface regardless of the thickness of the ceramic.

SUMMARY OF THE INVENTION

Hence, the present invention solves the aforementioned problems. The present invention provides both a thin silicon nitride ceramic and a thick silicon nitride ceramic, each of which is excellent in the strength of the fired surface and each of which decreases the cost for producing the final product. The present invention also provides a process for producing such a silicon nitride ceramic.

The present inventors have earnestly studied, noting the properties of a silicon nitride ceramic such as the pore size and strength of the fired surface, and found that the above-described problems can be minimized by specifying the mixing ratio of $\beta$-$Si_3N_4$ in the raw material powder, which led to the completion of the present invention.

Accordingly, the silicon nitride ceramic of the present invention, which is substantially composed of a silicon nitride and a rare earth oxide compound, is characterized in that the ratio of the transverse rupture strength of the fired surface used as a tensile surface at room temperature to the transverse rapture strength, at room temperature, of the worked surface used as a tensile surface subjected to working so as to have a surface roughness of $R_{max}$ 0.8 μm or less is 0.7 or more, and the strength ratio is satisfied even when any portion besides the fired surface is utilized as the tensile surface to be worked to have a surface roughness of $R_{max}$ 0.8 μm or less.

$R_{max}$ is a parameter for measuring surface roughness defined by JIS B 0601, which denotes the difference of the height between the highest point and and the lowest point in a predetermined part of the curved line made by the cross section and the surface. Therefore, the relation between $R_{max}$ and $R_a$, which is another parameter for measuring surface roughness, can be expressed by the formula: $R_{max} \approx 4R_a$.

The process for producing a silicon nitride ceramic of the present invention is characterized in that $\alpha$-$Si_3N_4$ powder and $\beta$-$Si_3N_4$ powder are mixed to obtain a raw material powder so as to satisfy the following formula:

$$0.05 \leq \beta/\alpha+\beta \leq 0.50$$

($\alpha$ refers to the weight of $\alpha$-$Si_3N_4$ powder, and $\beta$ refers to the weight of $\beta$-$Si_3N_4$ powder.)

A sintering aid is added to and mixed with the raw material powder. Then, the powder is formed to give a compact. After that, the compact is fired at a temperature ranging from 1800° to 2000° C. under a nitrogen atmosphere having an atmospheric pressure of at least 1 atm.

DETAILED DESCRIPTION OF THE INVENTION

According to the present invention, there is obtained a $Si_3N_4$ ceramic, in which the difference of the surface strength between the fired surface and the surface subjected to working (hereinafter referred to as a worked surface) is small, by controlling the compounding ratio of $\alpha$-$Si_3N_4$ powder and $\beta$-$Si_3N_4$ powder.

Therefore, the obtained ceramic already possesses sufficient strength required to be used as a product before it is subjected to working unlike a silicon nitride ceramic obtained by any of conventional processes. When the compact is formed so as to have a near net shape which excludes a margin to be removed by working after firing, the obtained ceramic does not need to be subjected to working.

Thus, the strength on the fired surface is improved since a pore size in the ceramic becomes small by controlling the mixing ratio of $\beta$-$Si_3N_4$ powder. Though the reason is not clear at present, it can be surmised as follows:

As the sintering mechanism of a $Si_3N_4$ ceramic, first, $SiO_2$ particles and a sintering aid such as $Y_2O_3$ particles, existing on the surface of $Si_3N_4$ powder particles, melt and react to form a liquid phase in the step of firing, and as the reaction proceeds, α-Si₃N₄ particles and β-Si₃N₄ particles, which were lying scattered at random before firing, are disposed regularly.

Then, all of the α-Si₃N₄ particles and some of the β-Si₃N₄ particles melt, and then precipitate and grow as columnar crystals of β-Si₃N₄ around the remaining β-Si₃N₄ particles (relatively large sized β-Si₃N₄ particles) each of which works as a core for the crystal growth. The Si₃N₄ ceramic seems to be obtained in this way.

In such a sintering mechanism, when a large amount of α-Si₃N₄ powder is contained in the raw material powder, the amount of α-Si₃N₄ particles transformed into β-Si₃N₄ particles is large, and the amount of the remaining β-Si₃N₄ particles, each of which works as a core for the crystal growth, is small. In this case, the strength of the fired surface of the obtained ceramic is lowered because the distribution of β-Si₃N₄ crystals becomes uneven, which makes the size of pores rather large.

In contrast, when a large amount of β-Si₃N₄ powder is contained in the raw material powder, the amount of α-Si₃N₄ particles transformed into β-Si₃N₄ particles is small, and the amount of the remaining β-Si₃N₄ particles, each of which works as a core for the crystal growth, is large. In this case, the size of pores existing on the surface of the compact before firing does not become smaller and as the diameters of the β-Si₃N₄ particles after sintering become too small, and as a result, the pores become rather large, giving the same disadvantage.

Accordingly, it is presumed that the strength of the fired surface can be improved by controlling the amount of β-Si₃N₄ powder contained in the raw material powder within the range given by the present invention because it makes the above mentioned transition from α-Si₃N₄ to β-Si₃N₄ appropriate and makes the pore size smaller.

Next, a description is made of a silicon nitride ceramic of the present invention.

A silicon nitride ceramic of the present invention is characterized in that the difference between the strength of the fired surface and the strength of the worked surface is small. For example, when the surface of the ceramic of the present invention is worked with abrasive grains having a size of #800, the surface roughness indicated by Rmax becomes about 0.8 μm or less. The ratio of the four-point bending strength (transverse rapture strength), at room temperature, of the fired surface used as the tensile surface to the four-point bending strength, at room temperature, of the worked surface used as the tensile surface is at least 0.7.

Further, this strength ratio is satisfied even when any portion besides the fired surface is utilized for the tensile surface to be worked. That is, even when a portion around the fired surface or around the center of the ceramic is utilized for the tensile surface to be worked, the above-described ratio is satisfied.

When the strength ratio is less than 0.7, the strength of the fired surface is not satisfactory, and it is not preferable to use such a fired surface as a surface of the final product from a practical view point. Further, the strength of the fired surface itself at a room temperature is preferably larger than 650 MPa, more preferably 700 MPa.

Furthermore, a pore size on the fired surface of the ceramic of the present invention is preferably not larger than 50×50 μm. "Pore size" is the size of pores existing in the cross section generated by a transverse rupture of the silicon nitride ceramic. When a pore is oval, the pore size is expressed by "a×b", referring to the length of the longer axis as a and the shorter axis as b.

When a pore exists on the tensile surface of the silicon nitride ceramic, the pore size is expressed by "a×b", referring to the length of the longer axis on the surface as a and the depth of the pore as b.

The significance of this measurement is based on the fact that such a rupture starts at such a pore when a ceramic in which the fired surface is utilized as the tensile surface is ruptured.

A pore larger than 50×50 μm is not preferable because not only the strength but also the oxidation resistance of the ceramic deteriorates.

Further, $R_{max}$ of the fired surface is preferably 15 μm or less. When $R_{max}$ is lager than 15 μm, it is not preferable because the strength of the ceramic deteriorates.

Regarding the size of the columnar silicon nitride particles existing on the fired surface of the ceramic, it is preferable that the length perpendicular to the axis is 4 μm or less and the axis is 50 μm or less. When the size is larger than 4 μm×50 μm, it is not preferable because the strength of the ceramic is lowered since the columnar particles induce the rupture of the ceramic.

Moreover, concerning a sintered silicon nitride ceramic of the present invention, even a thick ceramic having a thickness of, for example 20–150 mm, as well as a thin ceramic, possesses excellent properties. Therefore, a silicon nitride ceramic of the present invention can be applied to various uses.

Next, the process for producing a silicon nitride ceramic of the present invention is described.

First, α-Si₃N₄ powder and β-Si₃N₄ powder are mixed so as to satisfy the following formula:

$$0.05 \leq \beta/\alpha+\beta \leq 0.50$$

(α refers to the weight of α-Si₃N₄ powder, β refers to the weight of β-Si₃N₄ powder.) It is preferable that the average diameter of the α-Si₃N₄ powder particles is 0.3–1.0 μm and that the average diameter of the β-Si₃N₄ powder particles is 0.3–3 μm. When the average diameter of the α-Si₃N₄ powder particles is larger than 1.0 μm, the sinterability deteriorates. When the average diameter of the β-Si₃N₄ powder particles is larger than 3 μm, the length perpendicular to the axis of the columnar crystals of β-Si₃N₄ obtained by sintering becomes at least 3 μm, which is not preferable.

The amount of oxygen contained in α-Si₃N₄ raw material powder can be increased by such a method that α-Si₃N₄ raw material powder is fluidized in the reheating furnace, the temperature of which is controlled to be, for example, 300° C.–800° C., for 1–20 hours and a method that α-Si₃N₄ raw material powder is stirred in a slurry which has a temperature of 30°–80° C. and in which the amount of water is controlled.

The α-Si₃N₄ is preferably treated by such a method because such a method further enhances the strength and the like of the Si₃N₄ ceramic to be obtained.

To the obtained powder mixture is added 3–25 wt % of a sintering aid in proportion to the sum of the powder mixture and the sintering aid. The sintering aid is not particularly restricted, and, for example, a rare earth oxide such as $Y_2O_3$, $Yb_2O_3$, and $Er_2O_3$, and a metal carbide such as $MoC_2$ and SiC, and the like can be employed. More than one sintering aid may be employed.

Then, the mixture is subjected to a mixed grinding using, for example, silicon nitride balls, followed by drying to obtain a powder for forming a compact.

Then, the obtained powder is subjected to a molding such as press molding, extrusion molding, and slip casting to obtain a compact having a desired shape.

The obtained compact is then fired at a temperature of about 1800°–2000° C. under a nitrogen atmosphere having an atmospheric pressure of at least 1 atm for about 2–8 hours to obtain a sintered $Si_3N_4$ ceramic.

The atmospheric pressure and the firing temperature is preferably controlled so that silicon nitride is not decomposed during firing. Further, the fired ceramic may be subjected to a heat treatment, if desired, at a temperature of about 1000°–1500° C. under an ambient atmosphere for about 0.5–10 hours.

The present invention is hereinafter described in more detail by way of Examples and Comparative Examples. However, the present invention is not restricted by the following Examples.

EXAMPLES 1–6

$\alpha$-$Si_3N_4$ powder having a purity of 97 wt %, an oxygen content of 1.40 wt %, and BET specific surface area of 12.0 $m^2/g$ and $\beta$-$Si_3N_4$ powder having a purity of 98 wt %, an oxygen content of 0.8 wt %, and BET specific surface area of 9.0 $m^2/g$ are mixed in the ratio shown in Table 1.

To the mixture were added three kinds of sintering aids, i.e. $Y_2O_3$ having an average particle diameter of 0.7 μm and BET specific surface area of 10.0 $m^2/g$, $MoC_2$ having an average particle diameter of 1.5 μm and BET specific surface area of 2.0 $m^2/g$, and SiC having an average particle diameter of 0.2 μm and BET specific surface area of 20.0 $m^2/g$.

The mixing ratio of each of the sintering aids, (i.e., $Y_2O_3$, $MoC_2$, and SiC) is respectively 8 wt %, 2 wt %, and 1 wt % in proportion to the sum of the powder mixture and the sintering aids.

The obtained mixture of 20 Kg and silicon nitride balls of 40 g, which work as a medium for stirring, and water were put into a mill for stirring, having an internal volume of 100 liter, and the mixture was subjected to grinding for 3 hours. Subsequently, the mixture was dried to vaporize the water, and thus, to obtain granulated powder particles having an average diameter of 50 μm for forming a compact.

Then, the powder was subjected to press molding under a pressure of 200 kg/cm², followed by isostatic pressing under 5 ton/cm² to obtain a compact having dimensions of 80 mm×80 mm×6 mm (thickness). This compact was fired at a temperature of 1900° C. in a nitrogen atmosphere under an atmospheric pressure of 9.5 atm for 3 hours to obtain a silicon nitride ceramic having dimensions of about 67 mm×67 mm×5 mm (thickness).

(Performance Evaluation)

(1) Strength of Fired Surface

The fired surface of the silicon nitride ceramic was not subjected to working and was used as a tensile surface. The ceramic was measured for four-point bending strength (transverse rupture strength) on the basis of JIS R 1601, except for tensile surface roughness, at a room temperature and at 1400° C. The results are shown in Table 1.

(2) Pore Size

The ruptured portions of the test piece which was measured for the strength of the fired surface were observed with a scanning electron microscope. At least five samples were measured for the size of each pores existing on such portions. The average size of the examined pores are shown in Table 1.

(3) Size of Silicon Nitride Columnar Crystal

The fired surface of the silicon nitride ceramic was observed with a scanning electron microscope. 100 columnar crystals on the fired surface were chosen at random. The average lengths parallel to the axis of the crystals and perpendicular to the axis of the crystals are shown in Table 1.

(4) Surface Roughness

The fired surface of the ceramic was measured for the surface roughness ($R_{max}$) using an instrument. The results are shown in Table 1.

(5) Strength of Worked Surface

The fired surface of the ceramic was subjected to working using grains having a size of #800 so that the surface roughness indicated by Rmax becomes 0.8 μm or less. The ceramic was measured for four-point bending strength at room temperature and at 1400° C. At this time, the tensile surface was taken out of the vicinity of the center of the ceramic having a thickness of 5 mm. The results are shown in Table 1. Additionally, the ratio of the strength of the fired surface to the strength of the worked surface at a room temperature ($\sigma_{as}/\sigma_{\#800}$) is also shown in Table 1.

COMPARATIVE EXAMPLES 1–7

The silicon nitride ceramics were obtained in the same manner as in Examples 1–6 except that the compounding ratio of $\alpha$-$Si_3N_4$ powder and $\beta$-$Si_3N_4$ powder was varied as shown in Table 1. The ceramics were measured for the same performance evaluations as described above. The results are shown in Table 1.

EXAMPLES 7–14, COMPARATIVE EXAMPLES 8–11

The silicon nitride ceramics were obtained in the same manner as in Examples 1–6 except that the compounding ratio of $\alpha$-$Si_3N_4$ powder and $\beta$-$Si_3N_4$ powder, the kind and the amount of sintering aids, and firing conditions were varied as shown in Table 2. The ceramics were measured for the same performance evaluation. The results are shown in Table 3.

The conditions of the sintering aids used were as follows:

|  | $Yb_2O_3$ | $Er_2O_3$ | $Sc_2O_3$ | WC | NbC | $MoSi_2$ | $WSi_2$ |
|---|---|---|---|---|---|---|---|
| Average Diameter (μm) | 0.5 | 0.6 | 0.9 | 0.6 | 2.0 | 3.0 | 3.0 |
| BET Specific Surface Area ($m^2/g$) | 9.0 | 9.0 | 9.0 | 2.5 | 3.0 | 4.0 | 3.0 |

EXAMPLES 15, 16 AND 20, AND COMPARATIVE EXAMPLES 12 AND 13

To $\alpha$-$Si_3N_4$ powder was added water in an 50 wt % in proportion to the sum of the weight of the powder and the water. The mixture was subjected to stirring treatment for 5 hours using an attriter mill so that the oxygen content in $\alpha$-$Si_3N_4$ powder is increased from 1.40 wt % to 1.50 wt %. The ceramics were obtained in the same manner as in Example 1–6 except for the kind and the amount of the sintering aids, which are shown in Table 4. The ceramics were measured for the same performance evaluations, and the results are shown in Table 5. The conditions of the sintering aids utilized are the same as the conditions described above.

EXAMPLES 17–19, AND COMPARATIVE EXAMPLES 14 AND 15

The ceramics were obtained in the same manner as in Examples 1–6 except that the oxygen content in $\alpha$-$Si_3N_4$ powder was increased from 1.40 wt % to 1.55 wt % by the treatment at 500° C. in an electric furnace for 5 hours. The ceramics were measured for the same performance evaluations, and the results are shown in Table 4 and 5. The conditions of the sintering aids utilized are the same as the conditions described above.

EXAMPLES 21–24, AND COMPARATIVE EXAMPLES 16–18

The ceramics were obtained in the same manner as in Examples 1–6 except that there were utilized α-$Si_3N_4$ powder having a purity of 97 wt %, an average particle diameter of 0.6 μm, an oxygen content of 1.3 wt %, and BET specific surface area of 12 $m^2$/g ((α-$Si_3N_4$ content of 98%) and β-$Si_3N_4$ powder having a purity of 98 wt %, an average particle diameter of 0.8 atm, an oxygen content of 1.0 wt %, and BET specific surface area of 9 $m^2$/g (β-$Si_3N_4$ content of 95%), and that the compounding ratio and the firing conditions were controlled as shown in Table 6.

The compacts having the dimensions of 80 mm×80 mm×24 mm (thickness), 100 mm×1.00 mm×60 mm (thickness), and 150 mm×150 mm×120 mm (thickness) were subjected to treatment to obtain thick ceramics each having a thickness of 20 mm, 50 mm, and 100 mm respectively under the condition shown in Table 6. Each of the obtained ceramics were measured for the strength of the fired surface and the worked surface, and the results are shown in Table 7.

Regarding the measurement for the strength, two kinds of tensile surfaces were measured, i.e., (1) a worked surface obtained by abrasion to remove a thickness of 500 μm from the fired surface (outer portion of the ceramic), and (2) a portion just in the middle of the thickness of the ceramic (inner portion of the ceramic). The ratio of the strength on the fired surface to the strength of the tensile surface in outer portion ($\sigma_{as}/\sigma_{out}$) and inner portion ($\sigma_{as}/\sigma_{in}$) are also shown in Table 7.

TABLE 2

| | Compounding ratio | | Amount of sintering aid | Firing conditions |
|---|---|---|---|---|
| | α*1 | β*2 | (wt %) | °C. · hr · atm |
| Example | | | | |
| 7 | 95 | 5 | 12$Y_2O_3$, 1$Mo_2C$ | 1900 · 6 · 10 |
| 8 | 80 | 20 | 14$Yb_2O_3$ | 1850 · 4 · 5 |
| 9 | 70 | 30 | 3$Y_2O_3$, 13$Yb_2O_3$, 5SiC | 2000 · 3 · 10 |
| 10 | 90 | 10 | 10$Er_2O_3$, 2$Mo_2C$, 2SiC | 1900 · 4 · 10*3 |
| 11 | 50 | 50 | 5$Sc_2O_3$, 2NbC | 1900 · 2 · 10*4 |
| 12 | 80 | 20 | 5$Y_2O_3$, 5$Er_2O_3$, 0.5WC, 1SiC | 1950 · 4 · 10 |
| 13 | 70 | 30 | 5$Y_2O_3$, 5$Yb_3O_3$, 2$MoSi_2$ | 1800 · 5 · 3 |
| 14 | 90 | 10 | 4$Sc_2O_3$, 4$Yb_2O_3$, 3$WSi_2$ | 1800 · 5 · 3 |
| Comparative Example | | | | |
| 8 | 0 | 100 | 6$Y_2O_3$, 5SiC | 1900 · 4 · 10 |
| 9 | 100 | 0 | 10$Er_2O_3$, 2$WSi_2$ | 1850 · 5 · 5 |
| 10 | 30 | 70 | 12$Er_2O_3$, 6$Yb_2O_3$, 3$Mo_2C$ | 2000 · 2 · 10*5 |
| 11 | 10 | 90 | 3$Y_2O_3$, 5$Sc_2O_3$, 2SiC | 1900 · 3 · 10 |

*1α—$Si_3N_4$ powder
*2β—$Si_3N_4$ powder
*3The test piece was worked and then subjected to heat treatment at 1300° C. for 5 hours.
*4The test piece was worked and then subjected to heat treatment at 1000° C. for 10 hours.
*5The test piece was worked and then subjected to heat treatment at 1500° C. for 1 hour.

TABLE 1

| | Compounding ratio | | Relative density | Strenght of worked surface (MPa) | | Strenght of fired surface (MPa) | | Ratio of strength at room temp. | Pore dimensions | Dimensions of columnar crystal | Surface roughness |
|---|---|---|---|---|---|---|---|---|---|---|---|
| | α*1 | β*2 | (%) | Room temp. | 1400° C. | Room temp. | 1400° C. | $\sigma_{as}/\sigma_{\#800}$ | μm | (μm) | $R_{max}$ |
| Example | | | | | | | | | | | |
| 1 | 95 | 5 | 98.2 | 920 | 800 | 700 | 780 | 0.76 | 50 × 50 | 50 × 3 | 15 |
| 2 | 90 | 10 | 99.3 | 930 | 800 | 840 | 790 | 0.90 | 50 × 40 | 30 × 3 | 8 |
| 3 | 80 | 20 | 99.7 | 1000 | 830 | 800 | 800 | 0.80 | 15 × 15 | 35 × 4 | 11 |
| 4 | 70 | 30 | 99.8 | 980 | 830 | 960 | 790 | 0.98 | 20 × 15 | 40 × 5 | 10 |
| 5 | 60 | 40 | 99.3 | 950 | 790 | 810 | 780 | 0.85 | 30 × 20 | 30 × 3 | 9 |
| 6 | 50 | 50 | 99.4 | 930 | 800 | 650 | 740 | 0.70 | 40 × 30 | 30 × 3 | 8 |
| Comparative Example | | | | | | | | | | | |
| 1 | 100 | 0 | 95.3 | 750 | 730 | 430 | 710 | 0.57 | 70 × 60 | 60 × 3 | 25 |
| 2 | 99 | 1 | 96.0 | 780 | 750 | 500 | 720 | 0.64 | 80 × 60 | 65 × 3 | 17 |
| 3 | 40 | 60 | 99.5 | 900 | 740 | 570 | 700 | 0.63 | 60 × 70 | 20 × 4 | 6 |
| 4 | 30 | 70 | 98.3 | 800 | 710 | 440 | 710 | 0.55 | 80 × 90 | 20 × 4 | 5 |
| 5 | 20 | 80 | 99.7 | 760 | 710 | 430 | 650 | 0.57 | 70 × 60 | 10 × 3 | 7 |
| 6 | 10 | 90 | 98.9 | 700 | 600 | 410 | 580 | 0.59 | 80 × 100 | 10 × 3 | 7 |
| 7 | 0 | 100 | 99.4 | 650 | 550 | 300 | 600 | 0.46 | 105 × 60 | 10 × 3 | 7 |

*1α—$Si_3N_4$ powder
*2β—$Si_3N_4$ powder

TABLE 3

| | Relative density (%) | Strength of worked surface (MPa) | | Strength of fired surface (MPa) | | Ratio of strength at room temp. $\sigma_{as}/\sigma_{\#800}$ | Pore dimensions μm | Dimensions of columnar crystal (μm) | Surface roughness $R_{max}$ |
|---|---|---|---|---|---|---|---|---|---|
| | | Room temp. | 1400° C. | Room temp. | 1400° C. | | | | |
| Example | | | | | | | | | |
| 7 | 98.0 | 950 | 790 | 670 | 780 | 0.70 | 50 × 40 | 50 × 3 | 14 |
| 8 | 99.2 | 800 | 760 | 660 | 780 | 0.82 | 20 × 20 | 40 × 3 | 12 |
| 9 | 99.5 | 780 | 780 | 690 | 780 | 0.89 | 25 × 25 | 40 × 3 | 10 |
| 10 | 98.6 | 820 | 810 | 800 | 800 | 0.98 | 35 × 30 | 45 × 3 | 13 |
| 11 | 97.3 | 920 | 780 | 670 | 760 | 0.73 | 40 × 50 | 30 × 3 | 9 |
| 12 | 99.5 | 860 | 800 | 820 | 790 | 0.95 | 20 × 30 | 40 × 3 | 10 |
| 13 | 98.5 | 930 | 740 | 750 | 750 | 0.81 | 30 × 20 | 40 × 4 | 9 |
| 14 | 98.1 | 850 | 800 | 680 | 800 | 0.80 | 30 × 30 | 50 × 4 | 14 |
| Comparative Example | | | | | | | | | |
| 8 | 99.4 | 560 | 550 | 250 | 500 | 0.45 | 80 × 70 | 10 × 3 | 7 |
| 9 | 95.3 | 830 | 760 | 520 | 750 | 0.63 | 70 × 60 | 70 × 3 | 20 |
| 10 | 99.8 | 940 | 720 | 520 | 700 | 0.55 | 80 × 90 | 20 × 2 | 5 |
| 11 | 98.5 | 700 | 620 | 280 | 600 | 0.40 | 80 × 100 | 10 × 2 | 8 |

*[1] α—$Si_3N_4$ powder
*[2] β—$Si_3N_4$ powder

TABLE 4

| | Compounding ratio | | Amount of sintering aid (wt %) | Firing conditions °C. · hr · atm |
|---|---|---|---|---|
| | α*[1] | β*[2] | | |
| Example | | | | |
| 15 | 95 | 5 | 12$Y_2O_3$, 1$Mo_2C$ | 1900 · 6 · 10 |
| 16 | 80 | 20 | 14$Yb_2O_3$ | 1850 · 4 · 5*[3] |
| 17 | 90 | 10 | 4$Sc_2O_3$, 4$Yb_2O_3$, 3$WSi_2$ | 1800 · 5 · 3 |
| 18 | 50 | 50 | 5$Sc_2O_3$, 2NbC | 1900 · 2 · 10*[4] |
| 19 | 70 | 30 | 5$Y_2O_3$, 5$Yb_2O_3$, 2$MoSi_2$ | 1800 · 5 · 3 |
| 20 | 60 | 40 | 3$Y_2O_3$, 14$Yb_2O_3$ | 2000 · 3 · 10 |
| Comparative Example | | | | |
| 12 | 70 | 30 | 8$Y_2O_3$, 1SiC | 1700 · 5 · 1 |
| 13 | 40 | 60 | 12$Y_2O_3$, 1$Mo_2C$ | 1900 · 6 · 10*[5] |
| 14 | 20 | 80 | 5$Y_2O_3$, 5$Yb_2O_3$, 2$MoSi_2$ | 1800 · 5 · 3 |
| 15 | 0 | 100 | 10$Y_2O_3$, | 1900 · 4 · 10 |

*[1] α—$Si_3N_4$ powder
*[2] β—$Si_3N_4$ powder
*[3] The test piece was worked and then subjected to heat treatment at 1200° C. for 5 hours.
*[4] The test piece was worked and then subjected to heat treatment at 1300° C. for 5 hours.
*[5] The test piece was worked and then subjected to heat treatment at 1500° C. for 1 hour.

TABLE 5

| | Relative density (%) | Strength of worked surface (MPa) | | Strength of fired surface (MPa) | | Ratio of strength at room temp. $\sigma_{as}/\sigma_{\#800}$ | Pore dimensions μm | Dimensions of columnar crystal (μm) | Surface roughness $R_{max}$ |
|---|---|---|---|---|---|---|---|---|---|
| | | Room temp. | 1400° C. | Room temp. | 1400° C. | | | | |
| Example | | | | | | | | | |
| 15 | 99.0 | 1020 | 760 | 850 | 740 | 0.83 | 40 × 50 | 45 × 3 | 13 |
| 16 | 99.5 | 1100 | 810 | 990 | 800 | 0.90 | 30 × 10 | 50 × 3 | 12 |
| 17 | 98.5 | 1060 | 820 | 840 | 800 | 0.79 | 30 × 40 | 45 × 3 | 14 |
| 18 | 99.5 | 980 | 760 | 810 | 740 | 0.83 | 20 × 40 | 30 × 2 | 10 |
| 19 | 99.4 | 950 | 780 | 900 | 790 | 0.95 | 20 × 30 | 40 × 2 | 10 |
| 20 | 98.3 | 960 | 900 | 940 | 840 | 0.98 | 40 × 50 | 35 × 3 | 9 |
| Comparative Example | | | | | | | | | |
| 12 | 78.5 | 120 | — | 80 | — | 0.67 | — | — | — |
| 13 | 99.6 | 940 | 740 | 650 | 730 | 0.69 | 90 × 80 | 30 × 2 | 10 |

TABLE 5-continued

| | Relative density (%) | Strength of worked surface (MPa) | | Strength of fired surface (MPa) | | Ratio of strength at room temp. $\sigma_{a}/\sigma_{\#800}$ | Pore dimensions μm | Dimensions of columnar crystal (μm) | Surface roughness $R_{max}$ |
|---|---|---|---|---|---|---|---|---|---|
| | | Room temp. | 1400° C. | Room temp. | 1400° C. | | | | |
| 14 | 98.7 | 900 | 720 | 530 | 710 | 0.59 | 40 × 70 | 40 × 2 | 8 |
| 15 | 96.3 | 700 | 650 | 370 | 600 | 0.53 | 100 × 40 | 20 × 3 | 7 |

*¹α—Si₃N₄ powder
*²β—Si₃N₄ powder

TABLE 6

| | Compounding ratio | | Amount of sintering aid (wt %) | Firing Conditions °C. · hr · atm | Ceramic (5 mm in thickness) | | | | |
|---|---|---|---|---|---|---|---|---|---|
| | | | | | Relative density (%) | Strength of worked surface (MPa) | | Strength of fired surface (MPa) Room temp. | Ratio of strength at room temp. $\sigma_{a}/\sigma_{\#800}$ |
| | α*¹ | β*² | | | | Room temp. | 1400° C. | | |
| Example | | | | | | | | | |
| 21 | 90 | 10 | 7Y₂O₃, 1WC | 1900 · 6 · 10 | 99.0 | 900 | 780 | 720 | 0.80 |
| 22 | 80 | 20 | 10Yb₂O₃, 2Mo₂C | 1800 · 3 · 5 | 99.5 | 860 | 750 | 730 | 0.85 |
| 23 | 70*³ | 30 | 5Y₂O₃, 5Yb₂O₃, 1SiC | 1800 · 8 · 5 | 97.8 | 1000 | 870 | 840 | 0.84 |
| 24 | 60 | 40 | 4Y₂O₃, 6Sc₂O₃, 2SiC | 1850 · 3 · 10 | 99.0 | 920 | 830 | 740 | 0.80 |
| Comparative Example | | | | | | | | | |
| 16 | 100 | 0 | 8Y₂O₃, 1WC | 1900 · 4 · 10 | 96.8 | 800 | 760 | 440 | 0.55 |
| 17 | 30 | 70 | 6Yb₂O₃, 1Mo₂C | 1800 · 5 · 5 | 99.3 | 800 | 710 | 470 | 0.59 |
| 18 | 10 | 90 | 3Y₂O₃, 8Sc₂O₃, 2SiC | 1850 · 3 · 10 | 98.7 | 760 | 680 | 440 | 0.58 |

*¹α—Si₃N₄ powder
*²β—Si₃N₄ powder
*³α—Si₃N₄ powder was subjected to wet treatment to increase the amount of oxygen from 1.3 wt % to 1.45 wt %.

TABLE 7

| | Thickness (mm) | Outer portion of ceramic | | | | | Inner portion of ceramic | | | | |
|---|---|---|---|---|---|---|---|---|---|---|---|
| | | Relative density (%) | Strength of fired surface Room temp. (MPa) | Strength of worked surface (MPa) | | Ratio of strength at room temp. $\sigma_{a}/\sigma_{out}$ | Relative density (%) | Strength of fired surface Room temp. (MPa) | Strength of worked surface (MPa) | | Ratio of strength at room temp. $\sigma_{a}/\sigma_{in}$ |
| | | | | Room temp. | 1400° C. | | | | Room temp. | 1400° C. | |
| Example | | | | | | | | | | | |
| 21 | 100 | 99.5 | 730 | 880 | 760 | 0.83 | 97.8 | 730 | 730 | 740 | 0.94 |
| 22 | 50 | 99.6 | 740 | 880 | 770 | 0.84 | 98.9 | 740 | 860 | 780 | 0.86 |
| 23 | 50 | 97.6 | 850 | 980 | 880 | 0.87 | 98.2 | 850 | 950 | 850 | 0.89 |
| 24 | 20 | 99.5 | 750 | 860 | 750 | 0.87 | 99.5 | 750 | 880 | 700 | 0.85 |
| Comparative Example | | | | | | | | | | | |
| 16 | 100 | 98.3 | 430 | 810 | 770 | 0.53 | 90.5 | 430 | 590 | 350 | 0.73 |
| 17 | 50 | 98.5 | 430 | 820 | 730 | 0.52 | 95.3 | 430 | 630 | 600 | 0.68 |
| 18 | 20 | 97.6 | 440 | 750 | 680 | 0.59 | 93.2 | 440 | 600 | 590 | 0.73 |

As shown in Tables 1–5, the silicon nitride ceramics in Examples 1–20, which are within the scope of the present invention, have a small difference in the strength between the worked surface and the fired surface and have small pore sizes. Moreover, the treatment to increase the amount of oxygen in α-Si₃N₄ powder improves the properties of the ceramic to be obtained as shown in Table 5.

Further, a ceramic of the present invention maintains the above-described strength in both inner and outer portions, and shows excellent properties regarding the strength.

As has been described up to this point, the present invention provides a silicon nitride ceramic which is excellent in the strength of the fired surface and which decreases the cost for producing the final product by specifying the mixing ratio of $\beta$-$Si_3N_4$ to the raw material. The present invention also provides a process for producing such a silicon nitride ceramic.

Therefore, the ceramic of the present invention does not need working after sintering so as to obtain satisfactory strength. When the ceramic is produced to have a near net shape, which does not have a margin to be removed by working, the ceramic does not need working.

Further, even a thick ceramic exhibits an excellent strength, and the applications of the ceramic can be expanded.

What is claimed is:

1. A silicon nitride ceramic comprising silicon nitride and a rare earth compound, wherein the ratio of (1) the transverse rupture strength, at room temperature, of a fired surface used as a tensile surface to (2) the transverse rupture strength, at room temperature, of a worked surface used as a tensile surface subjected to working so as to have a surface roughness of $R_{max}$ 0.8 μm or less is 0.83 or more and wherein pores on the fired surface each have a size of 50 μm×50 μm or smaller.

2. A silicon nitride ceramic according to claim 1, wherein said ceramic has a thickness of 20–150 mm.

3. A silicon nitride ceramic according to claim 1 or 2, wherein said transverse rupture strength at room temperature is 650 MPa or higher.

4. A silicon nitride ceramic according to claim 3, wherein said transverse rupture strength of said fired surface is 700 MPa or higher.

5. A silicon nitride ceramic according to claim 3, wherein the surface roughness (Rmax) of said fired surface is 15 μm or less.

6. A silicon nitride ceramic according to claim 5, wherein each silicon nitride columnar crystal existing on said fired surface is 4 μm or less in length perpendicular to the axis of said crystal and 50 μm or less in length parallel to the axis of said crystal.

7. A silicon nitride ceramic consisting essentially of silicon nitride and a rare earth compound, wherein the ratio of (1) the transverse rupture strength, at room temperature, of a fired surface used as a tensile surface to (2) the transverse rupture strength, at room temperature, of a worked surface used as a tensile surface subjected to working so as to have a surface roughness of $R_{max}$ 0.8 μm or less is 0.83 or more and wherein pores on the fired surface each have a size of 50 μm×50 μm or smaller.

* * * * *